US010402120B2

(12) United States Patent
Balakrishnan

(10) Patent No.: US 10,402,120 B2
(45) Date of Patent: Sep. 3, 2019

(54) MEMORY CONTROLLER ARBITER WITH STREAK AND READ/WRITE TRANSACTION MANAGEMENT

(71) Applicant: Advanced Micro Devices, Inc., Sunnyvale, CA (US)

(72) Inventor: Kedarnath Balakrishnan, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 42 days.

(21) Appl. No.: 15/272,626

(22) Filed: Sep. 22, 2016

(65) Prior Publication Data

US 2018/0018133 A1    Jan. 18, 2018

Related U.S. Application Data

(60) Provisional application No. 62/363,018, filed on Jul. 15, 2016, provisional application No. 62/377,367, filed on Aug. 19, 2016.

(51) Int. Cl.
*G06F 3/06* (2006.01)
*G06F 13/16* (2006.01)

(52) U.S. Cl.
CPC .......... *G06F 3/0659* (2013.01); *G06F 3/0611* (2013.01); *G06F 3/0683* (2013.01); *G06F 13/1673* (2013.01)

(58) Field of Classification Search
CPC .. G06F 13/1673; G06F 3/0611; G06F 3/0659; G06F 3/0683
See application file for complete search history.

(56) References Cited

U.S. PATENT DOCUMENTS

| 6,496,906 | B1 | 12/2002 | Novak et al. |
| 6,785,793 | B2* | 8/2004 | Aboulenein ........ G06F 12/0215 |
| | | | 711/154 |
| 7,194,561 | B2 | 3/2007 | Weber |
| 7,664,907 | B1 | 2/2010 | Hutsell et al. |
| 2003/0177296 | A1* | 9/2003 | Kurth .................. G06F 13/3625 |
| | | | 710/244 |

(Continued)

OTHER PUBLICATIONS

Search Report in European Patent Application No. EP162034946, dated Jul. 26, 2017, 5 pages.

(Continued)

*Primary Examiner* — Yaima Rigol
(74) *Attorney, Agent, or Firm* — Polansky & Associates, P.L.L.C.; Paul J. Polansky

(57) ABSTRACT

In one form, an apparatus includes a memory controller. The memory controller includes a command queue and an arbiter. The command queue receives and stores memory access requests. The arbiter picks the memory access requests from the command queue based on a plurality of criteria, and provides picked memory access requests to a memory channel. The arbiter includes a streak counter for counting a number of consecutive memory access requests of a first type that the arbiter picks from the command queue. When the streak counter reaches a threshold, the arbiter suspends picking requests of the first type and picks at least one memory access request of a second type. The arbiter provides the at least one memory access request of the second type to the memory channel.

28 Claims, 5 Drawing Sheets

(56) References Cited

U.S. PATENT DOCUMENTS

| | | |
|---|---|---|
| 2007/0156946 A1 | 7/2007 | Lakshmanamurthy et al. |
| 2007/0220361 A1* | 9/2007 | Barnum .............. G06F 11/3636 |
| | | 714/45 |
| 2008/0133853 A1 | 6/2008 | Jeddeloh |
| 2008/0288731 A1 | 11/2008 | Izumi |
| 2009/0019243 A1* | 1/2009 | Hur ....................... G06F 1/3225 |
| | | 711/158 |
| 2014/0122801 A1 | 5/2014 | Loh et al. |
| 2014/0310486 A1 | 10/2014 | Goodman et al. |
| 2014/0372711 A1 | 12/2014 | O'Connor et al. |
| 2015/0221358 A1* | 8/2015 | Brandi ................ G11C 11/4087 |
| | | 365/222 |

OTHER PUBLICATIONS

International Search Report and Written Opinion for International Application No. PCT/US2017/041716, dated Oct. 19, 2017, 17 pages.

Search Report in European Patent Application No. EP18211080.9, dated Feb. 11, 2019, 7 pages.

\* cited by examiner

MEMORY CONTROLLER ARBITER WITH STREAK AND READ/WRITE TRANSACTION MANAGEMENT

This application claims priority to U.S. Provisional Application No. 62/363,018, filed Jul. 15, 2016, entitled "Memory Controller Arbiter with Streak and Read/Write Transaction Management," and U.S. Provisional Application No. 62/377,367, filed Aug. 19, 2016, entitled "Memory Controller Arbiter with Streak and Read/Write Transaction Management."

BACKGROUND

Computer systems typically use inexpensive and high-density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs offer both high performance and low power operation by providing various low power modes.

Modern DDR memory controllers maintain queues to store pending memory access requests to allow them to pick the pending memory access requests out of order to increase efficiency. For example, the memory controllers can retrieve multiple memory access requests to the same row in a given rank of memory from the queue out of order and issue them consecutively to the memory system to avoid the overhead of precharging the current row and activating another row. However certain program threads repetitively access the same rank, bank, and page. Known memory controllers that group and select similar accesses to promote efficiency can "starve" other program threads and decrease overall system performance.

Figure 1:
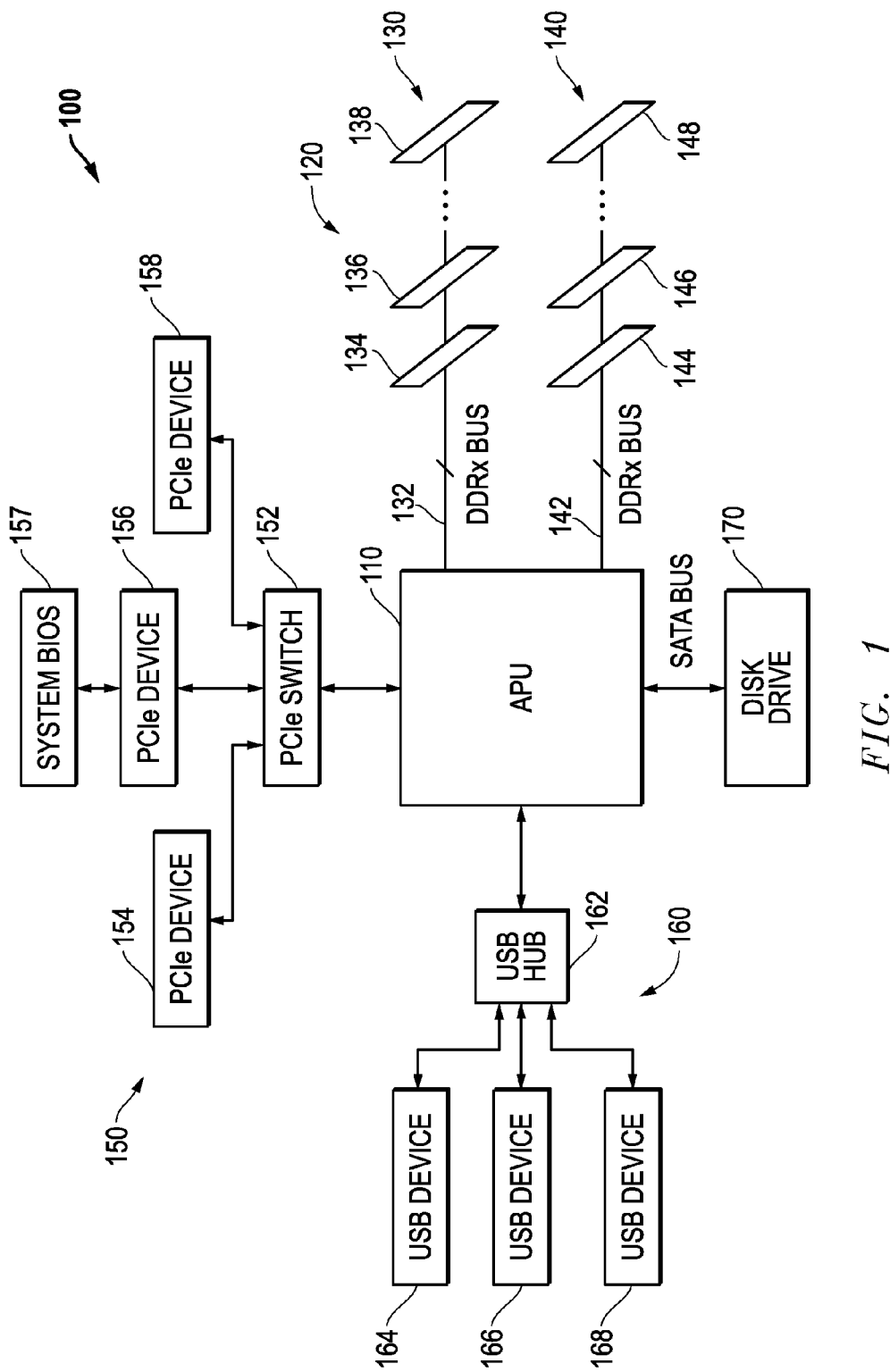
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form, an apparatus such as a data processing system includes a memory controller. The memory controller includes a command queue and an arbiter. The command queue receives and stores memory access requests. The arbiter picks the memory access requests from the command queue based on a plurality of criteria, and provides picked memory access requests to a memory channel. The arbiter includes a first streak counter for counting a number of consecutive memory access requests of a first type that the arbiter picks from the command queue. When the first streak counter reaches a first threshold, the arbiter suspends picking requests of the first type and picks at least one memory access request of a second type. The arbiter provides the at least one memory access request of the second type to the memory channel. For example, in one implementation of the streak counter, the first type of consecutive memory access requests includes page hit requests, and the second type of memory access requests includes page miss requests. In another implementation of the streak counter, the first type of consecutive memory access requests includes page hit requests to a first rank, and the second type of memory access requests includes page hit requests to a second rank.

In another form, an apparatus such as a data processing system includes a memory controller. The memory controller includes a decoder, a command queue, and an arbiter. The decoder receives memory access requests and decodes the memory access requests into a type. The command queue is coupled to the decoder for receiving and storing decoded memory access requests. The arbiter picks the memory access requests from the command queue based on a plurality of criteria, and provides picked memory access requests to a memory channel. The type indicates whether a corresponding memory access request is a read request or a write request. The arbiter scans the command queue and counts a number of memory access requests of a first type, wherein the first type is a selected one of the read request and the write request. When the number of memory access requests of the first type is greater than or equal to a first threshold, the arbiter suspends picking memory access requests of a second type and provides at least one memory access request of the first type to the memory channel, wherein the second type is a different one of the read request and the write request than the first type.

In yet another form, a method for sequencing memory access requests to a dynamic random access memory system includes receiving memory access requests. The memory access requests are stored in a command queue, wherein the memory access requests include memory access requests of a first type, and at least one memory access request of a second type. A streak of consecutive memory access requests of the first type is executed until a first threshold is reached. The command queue stores at least one additional memory access request of the first type and the at least one memory access request of the second type. At least one memory access request of the second type is executed after executing the memory access requests of said first type.

In still another form, a method for sequencing memory access requests to a dynamic random access memory system includes receiving memory access requests. The memory access requests are decoded into a type, wherein the type indicates whether a corresponding memory access request is a read request or a write request. The decoded memory access requests, including the type are stored in a command queue. The memory access requests are picked from the command queue based on a plurality of criteria. The picking includes scanning the command queue and counting a number of memory access requests of a first type, wherein the first type is a selected one of the read request and the write request. When the number of memory access requests of the first type is greater than or equal to a first threshold, picking the memory access requests of a second type is suspended and at least one memory access request of the first type is provided to a memory channel, wherein the second type is a different one of the read request and the write request than the first type.

FIG. 1 illustrates in block diagram form a data processing system 100 according to some embodiments. Data processing system 100 includes generally a data processor 110 in the form of an accelerated processing unit (APU), a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a DDRx bus 132, including representative DIMMs 134, 136, and 138 that in this example correspond to separate ranks. Likewise memory channel 140 includes a set of DIMMs connected to a DDRx bus 142, including representative DIMMs 144, 146, and 148.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like.

Data processing system 100 is suitable for use in modern computing applications by providing a memory channel 130 and a memory channel 140. Each of memory channels 130 and 140 can connect to state-of-the-art DDR memories such as DDR version four (DDR4), low power DDR4 (LPDDR4), graphics DDR version five (gDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Figure 2:
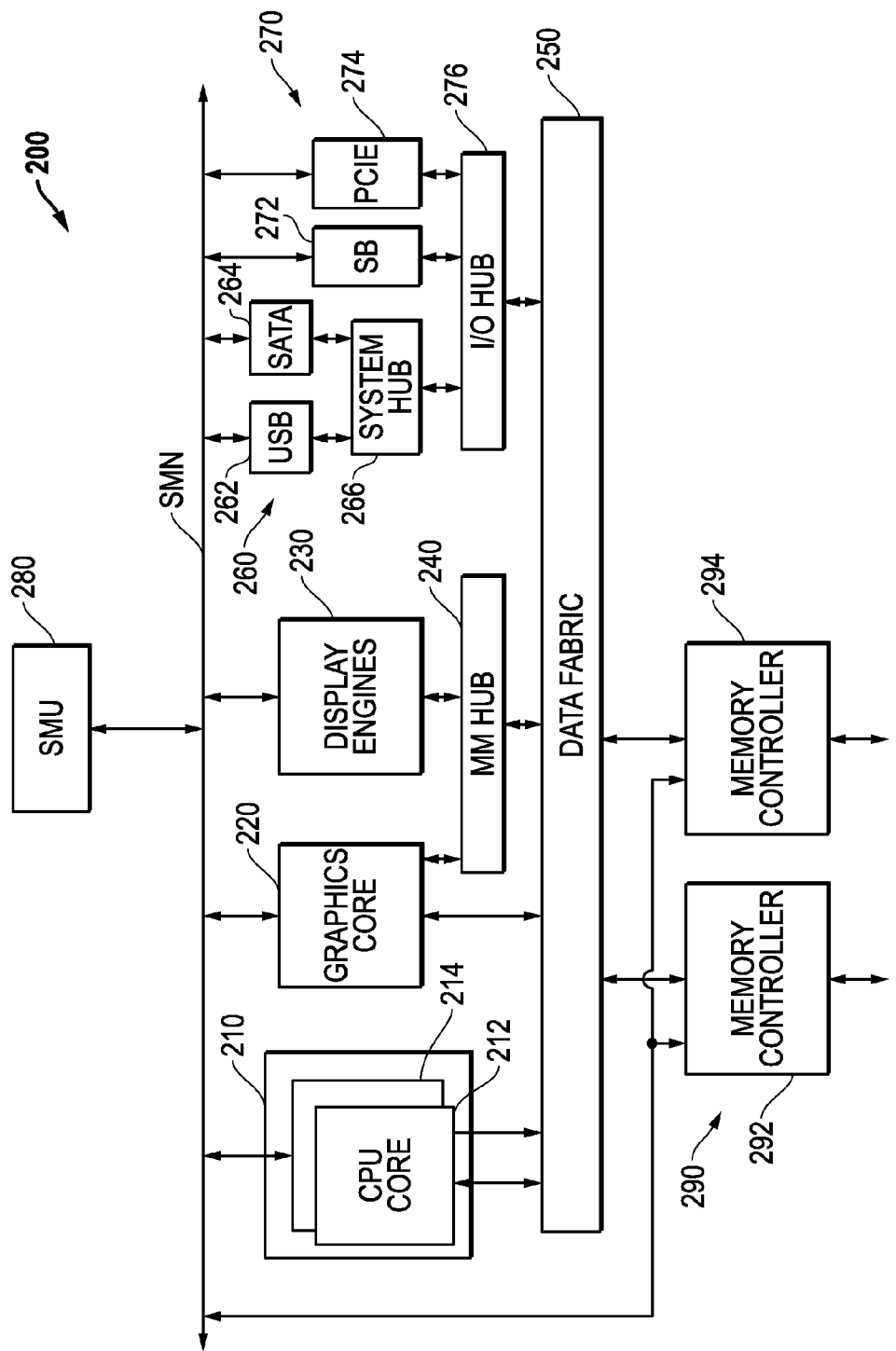
FIG. 2 illustrates in block diagram form an accelerated processing unit (APU) suitable for use in the data processing system of FIG. 1.

FIG. 2 illustrates in block diagram form an APU 200 suitable for use in data processing system 100 of FIG. 1. APU 200 includes generally a central processing unit (CPU) core complex 210, a graphics core 220, a set of display engines 230, a memory management hub 240, a data fabric 250, a set of peripheral controllers 260, a set of peripheral bus controllers 270, a system management unit (SMU) 280, and a set of memory controllers 290.

CPU core complex 210 includes a CPU core 212 and a CPU core 214. In this example, CPU core complex 210 includes two CPU cores, but in other embodiments CPU core complex can include an arbitrary number of CPU cores. Each of CPU cores 212 and 214 is bidirectionally connected to a system management network (SMN), which forms a control fabric, and to data fabric 250, and is capable of providing memory access requests to data fabric 250. Each of CPU cores 212 and 214 may be unitary cores, or may further be a core complex with two or more unitary cores sharing certain resources such as caches.

Graphics core 220 is a high performance graphics processing unit (GPU) capable of performing graphics operations such as vertex processing, fragment processing, shading, texture blending, and the like in a highly integrated and parallel fashion. Graphics core 220 is bidirectionally connected to the SMN and to data fabric 250, and is capable of providing memory access requests to data fabric 250. In this regard, APU 200 may either support a unified memory architecture in which CPU core complex 210 and graphics core 220 share the same memory space, or a memory architecture in which CPU core complex 210 and graphics core 220 share a portion of the memory space, while graphics core 220 also uses a private graphics memory not accessible by CPU core complex 210.

Display engines 230 render and rasterize objects generated by graphics core 220 for display on a monitor. Graphics core 220 and display engines 230 are bidirectionally connected to a common memory management hub 240 for uniform translation into appropriate addresses in memory system 120, and memory management hub 240 is bidirectionally connected to data fabric 250 for generating such memory accesses and receiving read data returned from the memory system.

Data fabric 250 includes a crossbar switch for routing memory access requests and memory responses between any memory accessing agent and memory controllers 290. It also includes a system memory map, defined by BIOS, for determining destinations of memory accesses based on the system configuration, as well as buffers for each virtual connection.

Peripheral controllers 260 include a USB controller 262 and a SATA interface controller 264, each of which is bidirectionally connected to a system hub 266 and to the SMN bus. These two controllers are merely exemplary of peripheral controllers that may be used in APU 200.

Peripheral bus controllers 270 include a system controller or "Southbridge" (SB) 272 and a PCIe controller 274, each of which is bidirectionally connected to an input/output (I/O) hub 276 and to the SMN bus. I/O hub 276 is also bidirectionally connected to system hub 266 and to data fabric 250. Thus for example a CPU core can program registers in USB controller 262, SATA interface controller 264, SB 272, or PCIe controller 274 through accesses that data fabric 250 routes through I/O hub 276.

SMU 280 is a local controller that controls the operation of the resources on APU 200 and synchronizes communication among them. SMU 280 manages power-up sequencing of the various processors on APU 200 and controls multiple off-chip devices via reset, enable and other signals. SMU 280 includes one or more clock sources not shown in FIG. 2, such as a phase locked loop (PLL), to provide clock signals for each of the components of APU 200. SMU 280 also manages power for the various processors and other functional blocks, and may receive measured power consumption values from CPU cores 212 and 214 and graphics core 220 to determine appropriate power states.

APU 200 also implements various system monitoring and power saving functions. In particular one system monitoring function is thermal monitoring. For example, if APU 200 becomes hot, then SMU 280 can reduce the frequency and voltage of CPU cores 212 and 214 and/or graphics core 220. If APU 200 becomes too hot, then it can be shut down entirely. Thermal events can also be received from external sensors by SMU 280 via the SMN bus, and SMU 280 can reduce the clock frequency and/or power supply voltage in response.

Figure 3:
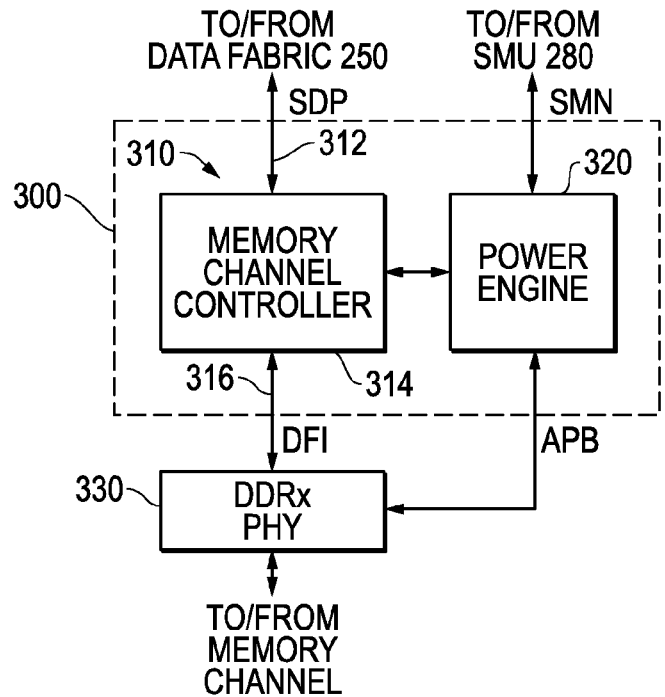
FIG. 3 illustrates in block diagram form a memory controller and associated physical interface (PHY) suitable for use in the APU of FIG. 2 according to some embodiments.

FIG. 3 illustrates in block diagram form a memory controller 300 and an associated physical interface (PHY) 330 suitable for use in APU 200 of FIG. 2 according to some embodiments. Memory controller 300 includes a memory channel 310 and a power engine 320. Memory channel 310 includes a host interface 312, a memory channel controller 314, and a physical interface 316. Host interface 312 bidirectionally connects memory channel controller 314 to data fabric 250 over a scalable data port (SDP). Physical interface 316 bidirectionally connects memory channel controller 314 to PHY 330 over a bus that conforms to the DDR-PHY Interface Specification (DFI). Power engine 320 is bidirectionally connected to SMU 280 over the SMN bus, to PHY 330 over the Advanced Peripheral Bus (APB), and is also bidirectionally connected to memory channel controller 314. PHY 330 has a bidirectional connection to a memory channel such as memory channel 130 or memory channel 140 of FIG. 1. Memory controller 300 is an instantiation of a memory controller for a single memory channel using a single memory channel controller 314, and has a power engine 320 to control operation of memory channel controller 314 in a manner that will be described further below.

Figure 4:
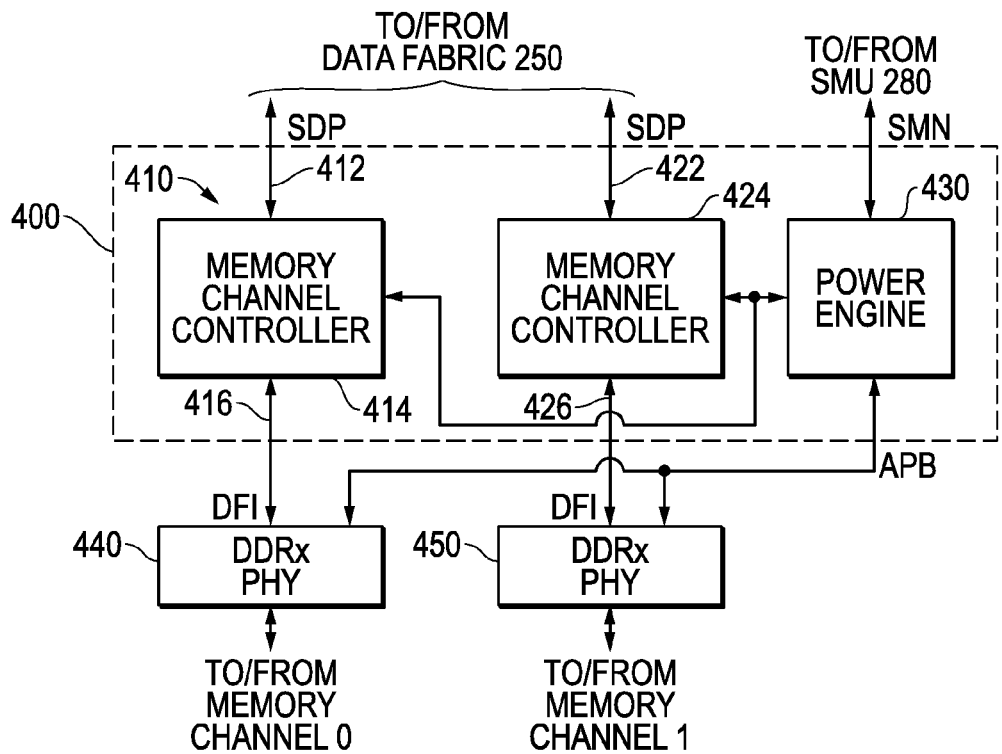
FIG. 4 illustrates in block diagram form another memory controller and associated PHY suitable for use in the APU of FIG. 2 according to some embodiments.

FIG. 4 illustrates in block diagram form another memory controller 400 and associated PHYs 440 and 450 suitable for use in APU 200 of FIG. 2 according to some embodiments. Memory controller 400 includes memory channels 410 and 420 and a power engine 430. Memory channel 410 includes a host interface 412, a memory channel controller 414, and a physical interface 416. Host interface 412 bidirectionally connects memory channel controller 414 to data fabric 250 over an SDP. Physical interface 416 bidirectionally connects memory channel controller 414 to PHY 440, and conforms to the DFI Specification. Memory channel 420 includes a host interface 422, a memory channel controller 424, and a physical interface 426. Host interface 422 bidirectionally connects memory channel controller 424 to data fabric 250 over another SDP. Physical interface 426 bidirectionally connects memory channel controller 424 to PHY 450, and conforms to the DFI Specification. Power engine 430 is bidirectionally connected to SMU 280 over the SMN bus, to PHYs 440 and 450 over the APB, and is also bidirectionally connected to memory channel controllers 414 and 424. PHY 440 has a bidirectional connection to a memory channel such as memory channel 130 of FIG. 1. PHY 450 has a bidirectional connection to a memory channel such as memory channel 140 of FIG. 1. Memory controller 400 is an instantiation of a memory controller having two memory channel controllers and uses a shared power engine 430 to control operation of both memory channel controller 414 and memory channel controller 424 in a manner that will be described further below.

Figure 5:
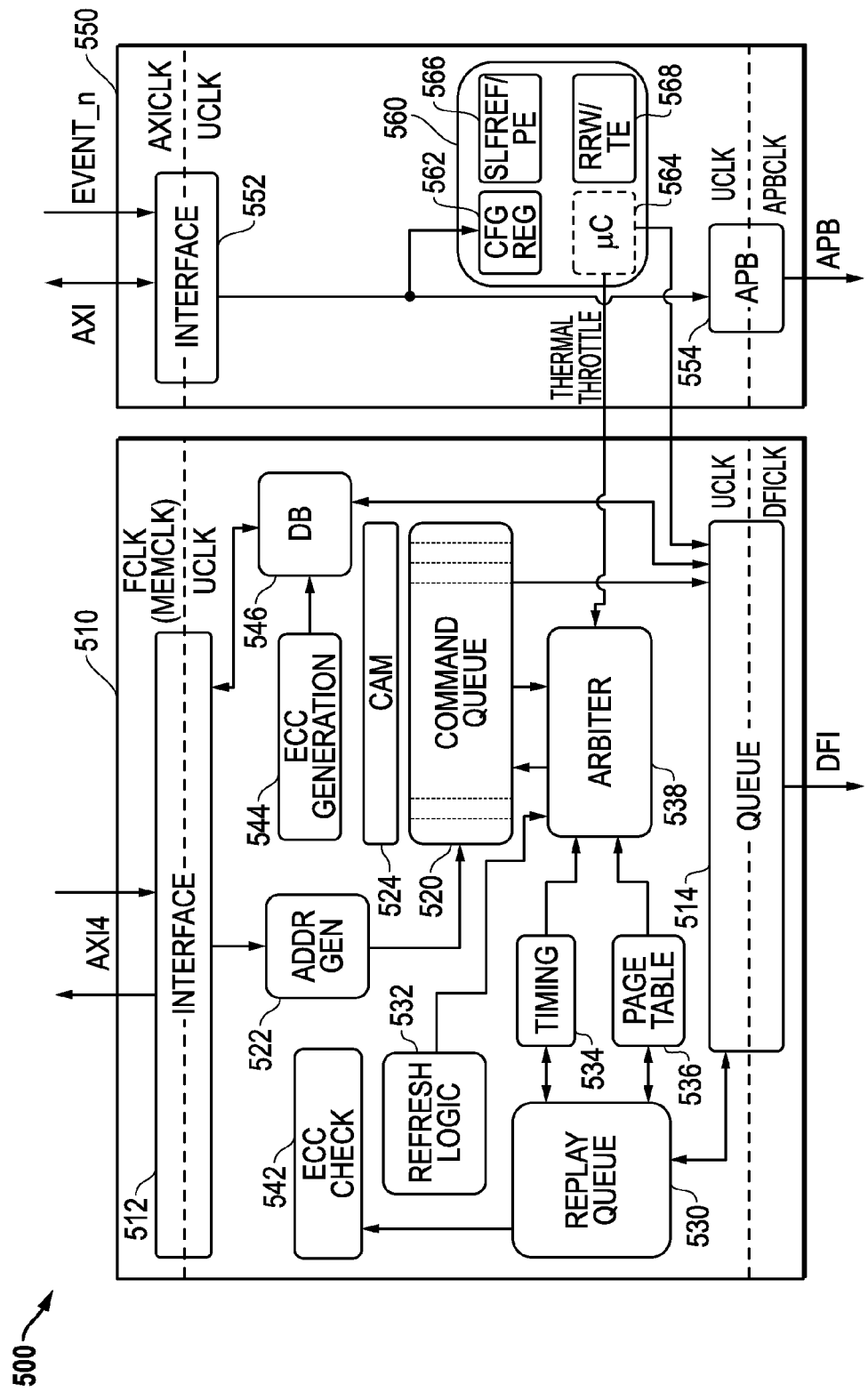
FIG. 5 illustrates in block diagram form a memory controller according to some embodiments.

FIG. 5 illustrates in block diagram form a memory controller 500 according to some embodiments. Memory controller 500 includes generally a memory channel controller 510 and a power controller 550. Memory channel controller 510 includes generally an interface 512, a queue 514, a command queue 520, an address generator 522, a content addressable memory (CAM) 524, a replay queue 530, a refresh logic block 532, a timing block 534, a page table 536, an arbiter 538, a error correction code (ECC) check block 542, an ECC generation block 544, and a data buffer (DB) 546.

Interface 512 has a first bidirectional connection to data fabric 250 over an external bus, and has an output. In memory controller 500, this external bus is compatible with the advanced extensible interface version four specified by ARM Holdings, PLC of Cambridge, England, known as "AXI4", but can be other types of interfaces in other embodiments. Interface 512 translates memory access requests from a first clock domain known as the FCLK (or MEMCLK) domain to a second clock domain internal to memory controller 500 known as the UCLK domain. Similarly, queue 514 provides memory accesses from the UCLK domain to the DFICLK domain associated with the DFI interface.

Address generator 522 decodes addresses of memory access requests received from data fabric 250 over the AXI4 bus. The memory access requests include access addresses in the physical address space represented in a normalized format. Address generator 522 converts the normalized addresses into a format that can be used to address the actual memory devices in memory system 120, as well as to efficiently schedule related accesses. This format includes a region identifier that associates the memory access request with a particular rank, a row address, a column address, a bank address, and a bank group. On startup, the system BIOS queries the memory devices in memory system 120 to determine their size and configuration, and programs a set of configuration registers associated with address generator 522. Address generator 522 uses the configuration stored in the configuration registers to translate the normalized addresses into the appropriate format. Command queue 520 is a queue of memory access requests received from the memory accessing agents in data processing system 100, such as CPU cores 212 and 214 and graphics core 220. Command queue 520 stores the address fields decoded by address generator 522 as well other address information that allows arbiter 538 to select memory accesses efficiently, including access type and quality of service (QoS) identifiers. CAM 524 includes information to enforce ordering rules, such as write after write (WAW) and read after write (RAW) ordering rules.

Replay queue 530 is a temporary queue for storing memory accesses picked by arbiter 538 that are awaiting responses, such as address and command parity responses, write cyclic redundancy check (CRC) responses for DDR4 DRAM or write and read CRC responses for GDDR5 DRAM. Replay queue 530 accesses ECC check block 542 to determine whether the returned ECC is correct or indicates an error. Replay queue 530 allows the accesses to be replayed in the case of a parity or CRC error of one of these cycles.

Refresh logic 532 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh logic 532 generates refresh commands periodically to prevent data errors caused by leaking of charge off storage capacitors of memory cells in DRAM chips. In addition, refresh logic 532 periodically calibrates ZQ to prevent mismatch in on-die termination resistance due to thermal changes in the system. Refresh logic 532 also decides when to put DRAM devices in different power down modes.

Arbiter 538 is bidirectionally connected to command queue 520 and is the heart of memory channel controller 510. It improves efficiency by intelligent scheduling of accesses to improve the usage of the memory bus. Arbiter 538 uses timing block 534 to enforce proper timing relationships by determining whether certain accesses in command queue 520 are eligible for issuance based on DRAM timing parameters. For example, each DRAM has a minimum specified time between activate commands to the same bank, known as "$t_{RC}$". Timing block 534 maintains a set of counters that determine eligibility based on this and other timing parameters specified in the JEDEC specification, and is bidirectionally connected to replay queue 530. Page table 536 maintains state information about active pages in each bank and rank of the memory channel for arbiter 538, and is bidirectionally connected to replay queue 530.

In response to write memory access requests received from interface 512, ECC generation block 544 computes an ECC according to the write data. DB 546 stores the write data and ECC for received memory access requests. It outputs the combined write data/ECC to queue 514 when arbiter 538 picks the corresponding write access for dispatch to the memory channel.

Power controller 550 generally includes an interface 552 to an advanced extensible interface, version one (AXI), an APB interface 554, and a power engine 560. Interface 552 has a first bidirectional connection to the SMN, which includes an input for receiving an event signal labeled "EVENT_n" shown separately in FIG. 5, and an output. APB interface 554 has an input connected to the output of interface 552, and an output for connection to a PHY over an APB. Power engine 560 has an input connected to the output of interface 552, and an output connected to an input of queue 514. Power engine 560 includes a set of configuration registers 562, a microcontroller (μC) 564, a self refresh controller (SLFREF/PE) 566, and a reliable read/write training engine (RRW/TE) 568. Configuration registers 562 are programmed over the AXI bus, and store configuration information to control the operation of various blocks in memory controller 500. Accordingly, configuration registers 562 have outputs connected to these blocks that are not shown in detail in FIG. 5. Self refresh controller 566 is an engine that allows the manual generation of refreshes in addition to the automatic generation of refreshes by refresh logic 532. Reliable read/write training engine 568 provides a continuous memory access stream to memory or I/O devices for such purposes as DDR interface read latency training and loopback testing.

Memory channel controller 510 includes circuitry that allows it to pick memory accesses for dispatch to the associated memory channel. In order to make the desired arbitration decisions, address generator 522 decodes the address information into predecoded information including rank, row address, column address, bank address, and bank group in the memory system, and command queue 520 stores the predecoded information. Configuration registers 562 store configuration information to determine how address generator 522 decodes the received address information. Arbiter 538 uses the decoded address information, timing eligibility information indicated by timing block 534, and active page information indicated by page table 536 to efficiently schedule memory accesses while observing other criteria such as QoS requirements. For example, arbiter 538 implements a preference for accesses to open pages to avoid the overhead of precharge and activation commands required to change memory pages, and hides overhead accesses to one bank by interleaving them with read and write accesses to another bank. In particular during normal operation, arbiter 538 may decide to keep pages open in different banks until they are required to be precharged prior to selecting a different page.

Arbiter 538 uses timing block 534 to determine timing eligibility for pending accesses, and then picks eligible accesses from command queue 520 based on a set of criteria that ensure both efficiency and fairness. Arbiter 538 supports two mechanisms to ensure both efficiency and fairness. First, arbiter 538 performs read/write transaction management to ensure both efficiency and fairness by examining attributes of memory access requests stored in command queue 520 as well as programmable threshold values to control the conditions in which reads are allowed to proceed while writes are allowed to make progress. Second, arbiter 538 includes streak counters that ensure that streaks of accesses of certain types are not allowed to hold the memory bus indefinitely. These two mechanisms will now be described.

Figures 6, 7:
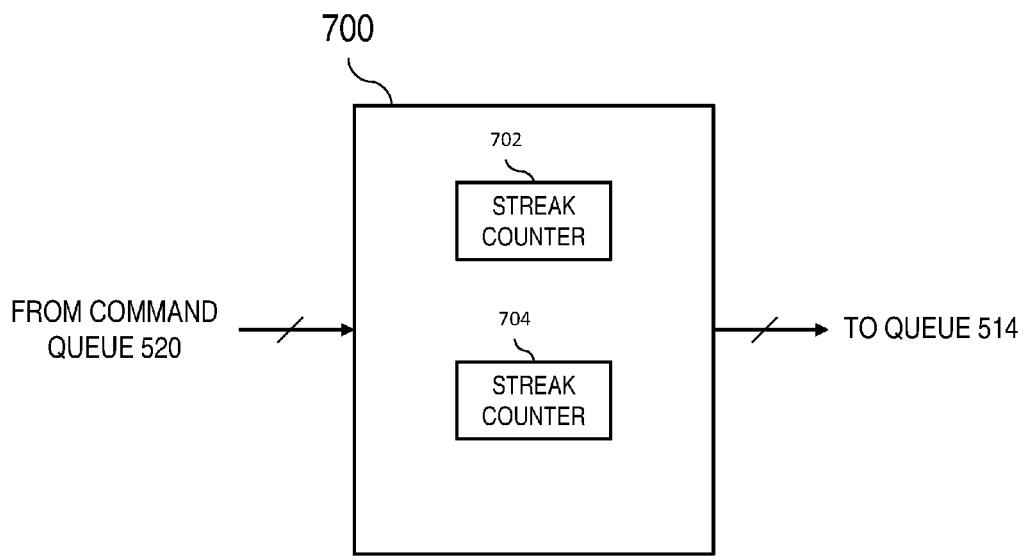
FIG. 6 illustrates a functional block diagram of a command queue that can be used to perform read/write transaction management according to some embodiments.
FIG. 7 illustrates in block diagram form an arbiter that can be used to implement streak management according to some embodiments.

FIG. 6 illustrates a functional block diagram 600 of command queue 520 of FIG. 5 that can be used to perform read/write transaction management according to some embodiments. Command queue 520 includes a plurality of randomly arranged READ and WRITE commands that it receives from address generator 522. Address generator 522 decodes each memory access request into a command type (read or write), a rank, a bank, a row, and a priority such that command queue 520 includes entries that collectively have a command field 602, a rank field 604, a bank field 606, a row field 608, and a priority field 610. For each command, priority field 610 stores an indication of an importance or priority rating for each READ or WRITE command. According to one aspect, therefore, arbiter 538 selects commands for execution based upon the type of command as well as a corresponding importance of the command as represented by the priority rating. As a further aspect, other considerations may also be utilized in picking commands for execution as will further be described herein.

In one particular example, arbiter 538 uses a set of threshold counters that take into account command type (e.g. reads or writes) as well as priority level (low, medium, and high). In this example, arbiter 538 includes low, medium, and high priority write threshold counters to count the number of low, medium, and high priority pending writes, respectively. Arbiter 538 also includes an opportunistic write threshold counter to enable writes to win in arbitration; a total write threshold to force arbiter 538 to firmly interrupt reads to service writes; a minimum write threshold counter to count the minimum number of writes that will be transmitted before returning to pending reads; and a minimum read threshold counter to count the minimum number of reads that will be transmitted before returning to pending writes. The threshold counters are summarized in TABLE I:

TABLE I

| Register Name | Register Function |
| --- | --- |
| LoPriWrThresh | Number of low priority writes |
| MedPriWrThresh | Number of medium priority writes |
| HiPriWrThresh | Number of high priority writes |
| OppWrThresh | Opportunistic write threshold to enable writes in arbitration decoder |
| TotalWrThresh | Total number of writes in command queue 520 for arbiter 538 to firmly turn from reads to writes |

TABLE I-continued

| Register Name | Register Function |
| --- | --- |
| MinWrThresh | Minimum number of writes that arbiter 538 will send out before turning back to reads |
| MinRdThresh | Minimum number of reads that arbiter 538 will send out before turning back to writes |

Arbiter 538 counts the number of reads/writes present in command queue 520 at any given time to determine if any of the thresholds are met. For this purpose, only entries that do not have an ordering-based or address-based dependency are counted. In the exemplary embodiment, to determine whether the TotalWrThresh is met, arbiter 538 determines a total number of weighted write requests by weighting the low, medium, and high priority requests by a corresponding significance.

Arbiter 538 changes or can change from servicing reads to servicing writes when any of three conditions occur. First, if the total number of pending writes in command queue 520 crosses either the TotalWrThresh or any of the per-priority counters (LoPriWrThresh, MedPriWrThresh, or HiPriWrThresh), arbiter 538 has sent the MinRdThresh number of reads since the last read-to-write turnaround, or there are no more reads in command queue 520, then arbiter 538 then switches to writes. Second, if the total number of writes is above the OppWrThresh, writes will be eligible for arbitration along with reads. This priority mechanism ensures that ACT commands to open pages for writes can be sent out while either waiting for total threshold to be met or the reads to be completed. Third, arbiter 538 changes from reads to writes when there are no pending reads in command queue 520. Note that if any of these conditions is met but memory controller 500 is performing a multi-cycle read burst and an option to continue the burst in this situation is set, then arbiter 538 considers the operation to be an atomic operation and it is completed before arbiter 538 changes from reads to writes. The number of pending writes at the time arbiter 538 changes from reads to writes becomes the maximum threshold for the current set of writes.

Arbiter 538 explicitly changes back to servicing reads only when the MinWrThresh number of writes has been sent and selectively after other conditions are met. In one embodiment, the other conditions include meeting one of a set of programmable thresholds for reads. These programmable thresholds mirror the thresholds shown in TABLE I. In this embodiment, the user can configure the corresponding read threshold registers with different and potentially lower values so that reads generally take preference over writes. Even in this example, arbiter 538 resumes servicing read requests immediately if there were no eligible write requests in command queue 520 and then one or more read requests are stored in and/or become eligible in command queue 520 after MinWrThresh was met.

In this example, one exception to these priority rules occurs is when a state known as the "Force Entry" state is set for any entry in command queue 520. The Force Entry state is set after an entry in command queue 520 has been bypassed several times. When the Force Entry is set for a write request while arbiter 538 is in read mode, arbiter 538 will switch from reads to writes. However once the Force Entry request has been performed, arbiter 538 will continue selecting writes before switching back to reads until it has send the minimum threshold of writes. Thus the MinRdThresh and MinWrThresh values establish a hysteresis logic to ensure that arbiter 538 is not sacrificing efficiency by turning the bus back and forth between reads and writes too often.

FIG. 7 illustrates in block diagram form an arbiter 700 that can be used to implement streak management according to some embodiments. Arbiter 700 receives information about the pending commands in command queue 520, and provides selection information to queue 514. In the example of FIG. 7, arbiter 700 includes two streak counters 702 and 704 to prevent one stream from accessing a single bank or rank and thereby taking up all memory bandwidth while other page hit requests are forced to wait indefinitely. Arbiter 538 uses one of streak counters 702 and 704 to keep track of the number of page hit accesses to a single bank in the presence of other page conflicts. Once the number of page hit accesses reaches a configurable count, then arbiter 538 will enable auto-precharge for the last read or write access and the earliest page conflict request is allowed to proceed.

Arbiter 700 uses another one of streak counters 702 and 704 to keep track of the number of page hit accesses to the same rank in the presence of page hits to other ranks. Once the number of page hit accesses to the same rank reaches a configurable count, then arbiter 700 blocks accesses to the same rank until it sends a command to another rank. Once arbiter 700 switches to the other rank, then all requests that go to the other rank will be eligible for arbitration, allowing them to make progress.

It should be apparent that more or different streak counters could be used to ensure fairness for other types of accesses that would otherwise cause an uninterrupted stream of accesses to take place. Also in the illustrated embodiment, configuration registers 562 include one or more registers that define the maximum allowed length of the streak.

The circuits of FIG. 5 may be implemented with various combinations of hardware and software. For example the hardware circuitry may include priority encoders, finite state machines, programmable logic arrays (PLAs), and the like, arbiter 538 could be implemented with a microcontroller executing stored program instructions to evaluate the relative timing eligibility of the pending commands. In this case some of the instructions may be stored in a non-transitory computer memory or computer readable storage medium for execution by the microcontroller. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

APU 110 of FIG. 1 or memory controller 500 of FIG. 5 or any portions thereof, such as arbiter 538, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the streak counters disclosed herein can be used for the above-mentioned types of accesses, or for other similar accesses. Streak counters for some but not all of the access types can be implemented. Moreover the tradeoff between efficiency and fairness can be changed according to the application environment by changing the thresholds described above.

Thus in one form, a circuit such as a data processor or a data processing system includes a memory controller having a command queue for receiving and storing memory access requests and an arbiter. The arbiter picks the memory access requests from the command queue based on a number of criteria and provides the picked memory access requests to a memory channel. The arbiter includes a first streak counter for counting a number of consecutive memory access requests of a first type that the arbiter picks from the command queue. When the first streak counter reaches a first threshold, the arbiter suspends picking requests of the first type and picks at least one memory access request of a second type. The first streak counter provides the at least one memory access request of the second type to the memory channel. For example, the first type can include page hit requests and the second type can include page conflict requests. When the first streak counter reaches the first threshold, the memory controller can further enable auto-precharge for a last memory access request of the first type to the memory channel before picking the at least one memory access request of the second type. In another example, the first type can include page hit requests to a first rank, and the second type can include page hit requests to a second rank.

The circuit can further include a decoder that receives memory access requests that each including an access address. The decoder decodes the access address into a rank, a bank, and a row. In this case for each memory access request, the command queue stores the rank, the bank, and the row, and the arbiter determines that the memory access request of the second type exists by examining at least one of the rank, the bank, and the row of all eligible memory access requests.

If the circuit is a data processing system, then the circuit can further include a memory accessing agent and a memory system. The memory accessing agent provides memory access requests to the memory controller, in which the memory access requests have access addresses. The memory system is coupled to the memory controller and is responsive to the memory access requests. The memory system has at least one rank of memory, in which each rank includes a set of banks each having a set of rows. In this case, the data processing system can further include a set of memory accessing agents each for providing memory access requests to the memory controller. Moreover the memory system can include set of memory channels each coupled to the memory controller, in which each of the set of memory channels has at least one rank of memory, each rank including a set of banks each having a set of rows.

In another form, a circuit such as a data processor or a data processing system includes a memory controller, in which the memory controller includes a decoder, a command queue, and an arbiter. The decoder receives memory access requests and decodes each memory access request into a type. The command queue is coupled to the decoder and receives and stores decoded memory access requests. The arbiter picks the memory access requests from the command queue based on a set of criteria and provides picked memory access requests to a memory channel. The type indicates whether a corresponding memory access request is a read request or a write request. The arbiter scans the command queue and counts a number of memory access requests of a first type. When the number of memory access requests of the first type is greater than or equal to a first threshold, the arbiter suspends picking memory access requests of a second type and provides at least one memory access request of the first type to the memory channel. For example, the first type can be a write request and the second type can be a read request. The memory controller can store the first threshold in a corresponding programmable register.

When the arbiter provides the at least one memory access request of the first type to the memory channel, the arbiter picks memory access requests of the first type until there are no more memory access requests of the first type in the command queue, or until the arbiter has picked a second threshold number of memory access requests of the first type. In this case, after the arbiter provides the at least one memory access request of the first type to the memory channel, the arbiter suspends picking memory access requests of the first type and picks memory access requests of the second type until there are no more memory access requests of the second type in the command queue or until the arbiter has picked a third threshold number of memory access requests of the second type.

For example, the number of memory access requests of the first type can be a total number of write requests, or a total number of write requests of a certain priority. In the latter case, the priority can be, for example, one of a low priority, a medium priority, and a high priority. In this case, the memory controller can store thresholds for the number of memory access requests of the certain priority in a set of programmable registers corresponding to the low priority, the medium priority, and the high priority.

If the circuit is a data processing system, then the circuit can further include a memory accessing agent and a memory system. The memory accessing agent provides memory access requests to the memory controller, in which the memory access requests have access addresses. The memory system is coupled to the memory controller and is responsive to the memory access requests. The memory system has at least one rank of memory, each rank including a set of banks each having a set of rows. In this case, the data processing system can further include a set of memory accessing agents each for providing memory access requests to the memory controller. Moreover the memory system can include set of memory channels each coupled to the memory controller, in which each of the set of memory channels has at least one rank of memory, each rank including a set of banks each having a set of rows.

In yet another form, a method for sequencing memory access requests to a dynamic random access memory includes receiving memory access requests. The memory access requests are stored in a command queue, and include memory access requests of a first type and at least one memory access request of a second type. A streak of consecutive memory access requests of the first type is executed until a first threshold is reached. The command queue stores at least one additional memory access request of the first type and the at least one memory access request of the second type. The at least one memory access request of the second type is executed after the memory access requests of the first type are executed. In one example the first type can be page hit requests, and the second type can be page miss requests. Auto-precharge can further be enabled for a last memory access request of the first type before executing the at least one memory access request of the second type. In another example, the first type can be page hit requests to a first rank, and the second type can be page hit requests to a second rank.

The received memory access requests can be decoded into a rank, a bank, and a row. The rank, the bank, and the row can be stored in a command queue. The at least one memory access request of the second type can be determined to exist by examining at least one of the rank, the bank, and the row of all eligible memory access requests.

In still another form, a method for sequencing memory access requests to a dynamic random access memory includes receiving memory access requests. The memory access requests are decoded into a type, wherein the type indicates whether a corresponding memory access request is read request or a write request. A streak of consecutive memory access requests of the first type is executed until a first threshold is reached, wherein the command queue stores at least one additional memory access request of the first type and the at least one memory access request of the second type. At least one memory access request of the second type is executed after executing the memory access requests of the first type.

For example, when providing the at least one memory access request of the first type to the memory channel, memory access requests of the first type can further be picked until there are no more memory access requests of the first type in the command queue or until a second threshold number of memory access requests of the first type has been picked. In this case, after providing the at least one memory access request of the first type to the memory channel, picking memory access requests of the first type can be suspended and memory access requests of the second type can be picked until there are no more memory access requests of the second type in the command queue or until after a third threshold number of memory access requests of the second type has been picked.

The memory access requests of the first type can include a total number of write requests, or a total number of write requests of a certain priority. The first threshold can be stored in a corresponding programmable register.

Accordingly, it is intended by the appended claims to cover all modifications of the disclosed embodiments that fall within the scope of the disclosed embodiments.

What is claimed is:

1. An apparatus comprising a memory controller, said memory controller comprising:
   a command queue for receiving and storing memory access requests; and
   an arbiter for picking said memory access requests from said command queue based on a plurality of criteria and for providing picked memory access requests to a memory channel, wherein:
      said arbiter comprises a first streak counter for counting a number of consecutive memory access requests of a first type, said first type being page hit accesses to a single bank in the presence of other page conflicts, that said arbiter picks from said command queue; and
      when said first streak counter reaches a first threshold, said arbiter suspends picking requests of said first type and picks at least one memory access request of a second type and provides said at least one memory access request of said second type to said memory channel.

2. The apparatus of claim 1, wherein said second type comprises page conflict requests.

3. The apparatus of claim 1, wherein when said first streak counter reaches said first threshold, said memory controller enables auto-precharge for a last memory access request of said first type to said memory channel before picking said at least one memory access request of said second type.

4. The apparatus of claim 1, wherein said first type comprises page hit requests to a first rank, and said second type comprises page hit requests to a second rank.

5. The apparatus of claim 1, further comprising:
   a decoder for receiving memory access requests each including an access address, and decoding said access address into a rank, a bank, and a row,
   wherein for each memory access request, said command queue stores said rank, said bank, and said row, and said arbiter determines that said at least one memory access request of said second type exists by examining at least one of said rank, said bank, and said row of all eligible memory access requests.

6. The apparatus of claim 1, wherein the apparatus is a data processing system further comprising:
   a memory accessing agent for providing memory access requests to said memory controller, said memory access requests having access addresses; and
   a memory system coupled to said memory controller, wherein said memory system is responsive to said memory access requests, said memory system having at least one rank of memory, each rank including a plurality of banks each having a plurality of rows.

7. The apparatus of claim 6, wherein said data processing system further comprises:
   a plurality of memory accessing agents each for providing memory access requests to said memory controller.

8. The apparatus of claim 6, wherein said memory system comprises:
   a plurality of memory channels each coupled to said memory controller, each of said plurality of memory channels having at least one rank of memory, each rank including a plurality of banks each having a plurality of rows.

9. An apparatus comprising a memory controller, said memory controller comprising:
   a decoder for receiving memory access requests and decoding each memory access request into a type;
   a command queue coupled to said decoder for receiving and storing decoded memory access requests; and
   an arbiter for picking said memory access requests from said command queue based on a plurality of criteria and for providing picked memory access requests to a memory channel, wherein:
      said type indicates whether a corresponding memory access request is a read request or a write request;
      said arbiter scans said command queue and counts a number of memory access requests of a first type, wherein said first type is a selected one of said read request and said write request; and
      when said number of memory access requests of said first type is greater than or equal to a first threshold, said arbiter suspends picking memory access requests of a second type and provides at least one memory access request of said first type to said memory channel, wherein said second type is a different one of said read request and said write request than said first type, wherein when said arbiter provides said at least one memory access request of said first type to said memory channel, said arbiter picks memory access requests of said first type until an earlier of: there are no more memory access requests of said first type in said command queue, and said arbiter has picked a second threshold number of memory access requests of said first type, wherein the memory controller stores each of said first and second thresholds in corresponding programmable registers.

10. The apparatus of claim 9, wherein said first type comprises said write request, and said second type comprises said read request.

11. The apparatus of claim 9, wherein after said arbiter provides said at least one memory access request of said first type to said memory channel, said arbiter suspends picking memory access requests of said first type and picks memory access requests of said second type until there are no more memory access requests of said second type in said command queue or until said arbiter has picked a third threshold number of memory access requests of said second type.

12. The apparatus of claim 9, wherein said memory access requests of said first type comprise a total number of write requests.

13. The apparatus of claim 9, wherein said number of memory access requests of said first type comprise a total number of write requests of a predetermined priority.

14. The apparatus of claim 13, wherein said predetermined priority comprises one of a low priority, a medium priority, and a high priority.

15. The apparatus of claim 14, wherein said memory controller stores thresholds for said number of memory access requests of said predetermined priority in a plurality of programmable registers corresponding to said low priority, said medium priority, and said high priority.

16. The apparatus of claim 9, wherein the apparatus is a data processing system further comprising:
a memory accessing agent for providing memory access requests to said memory controller, said memory access requests having an access addresses; and
a memory system coupled to said memory controller, wherein said memory system is responsive to said memory access requests, said memory system having at least one rank of memory, each rank including a plurality of banks each having a plurality of rows.

17. The apparatus of claim 16, wherein said data processing system further comprises:
a plurality of memory accessing agents each for providing memory access requests to said memory controller.

18. The apparatus of claim 16, wherein said memory system comprises:
a plurality of memory channels each coupled to said memory controller, each of said plurality of memory channels having at least one rank of memory, each rank including a plurality of banks each having a plurality of rows.

19. A method for sequencing memory access requests to a dynamic random access memory system, said method comprising:
receiving memory access requests;
storing said memory access requests in a command queue, wherein said memory access requests comprise memory access requests of a first type, said first type being consecutive page hit accesses to a single bank in the presence of other page conflicts, and at least one memory access request of a second type;
executing a streak of consecutive memory access requests of said first type until a first threshold is reached, wherein said command queue stores at least one additional memory access request of said first type and said at least one memory access request of said second type; and
executing said at least one memory access request of said second type after executing said memory access requests of said first type.

20. The method of claim 19, wherein said executing said memory access requests of said first type until said threshold is reached comprises:
counting a number of consecutive memory access requests of said first type; and
executing the at least one memory access request of said second type in response to said number being greater than or equal to said first threshold.

21. The method of claim 19, wherein said first type comprises page hit requests, and said second type comprises page miss requests.

22. The method of claim 19, further comprising:
enabling auto-precharge for a last memory access request of said first type before executing said at least one memory access request of said second type.

23. The method of claim 19, wherein said first type comprises page hit requests to a first rank, and said second type comprises page hit requests to a second rank.

24. The method of claim 19, further comprising:
decoding received memory access requests into a rank, a bank, and a row;
storing said rank, said bank, and said row in a command queue; and
determining that said at least one memory access request of said second type exists by examining at least one of said rank, said bank, and said row of all eligible memory access requests.

25. A method for sequencing memory access requests to a dynamic random access memory system, said method comprising:
storing a first threshold in a first programmable register;
storing a second threshold in a second programmable register;
receiving memory access requests;
decoding said memory access requests into a type, wherein said type indicates whether a corresponding memory access request is a read request or a write request;
storing decoded memory access requests including said type in a command queue; and
picking said memory access requests from said command queue based on a plurality of criteria, wherein said picking comprises:
scanning said command queue and counting a number of memory access requests of a first type, wherein said first type is a selected one of said read request and said write request;
when said number of memory access requests of said first type is greater than or equal to said first threshold, suspending picking said memory access requests of a second type and providing at least one memory access request of said first type to a memory channel, wherein said second type is a different one of said read request and said write request than said first type; and when providing said at least one memory access request of said first type to said memory channel, picking memory access requests of said first type until an earlier of: there are no more memory access requests of said first type in said command queue, and a second threshold number of memory access requests of said first type has been picked.

26. The method of claim 25, further comprising:

after providing said at least one memory access request of said first type to said memory channel, suspending picking memory access requests of said first type and picking memory access requests of said second type until there are no more memory access requests of said second type in said command queue or until after picking a third threshold number of memory access requests of said second type.

27. The method of claim 25, wherein said memory access requests of said first type comprise a total number of write requests.

28. The method of claim 25, wherein said memory access requests of said first type comprise a total number of write requests of a predetermined priority.

* * * * *